United States Patent
Yang

(10) Patent No.: US 10,286,942 B2
(45) Date of Patent: May 14, 2019

(54) LOCKING DEVICE FOR WHEELS OF A BABY CARRIAGE

(71) Applicant: Sunnylove Baby Products Zhuhai Co., Ltd, Zhuhai (CN)

(72) Inventor: Cheng-Fan Yang, Tainan (TW)

(73) Assignee: Sunnylove Baby Products Zhuhai Co., Ltd (CN)

(*) Notice: Subject to any disclaimer, the term of this patent is extended or adjusted under 35 U.S.C. 154(b) by 0 days.

(21) Appl. No.: 15/895,219

(22) Filed: Feb. 13, 2018

(65) Prior Publication Data
US 2019/0047603 A1 Feb. 14, 2019

(30) Foreign Application Priority Data

Aug. 10, 2017 (CN) .................... 2017 2 1000485 U

(51) Int. Cl.
| B62B 7/08 | (2006.01) |
| B62B 9/08 | (2006.01) |
| F16D 63/00 | (2006.01) |
| F16D 121/14 | (2012.01) |
| F16D 125/34 | (2012.01) |

(52) U.S. Cl.
CPC ............ B62B 9/082 (2013.01); B62B 9/087 (2013.01); F16D 63/006 (2013.01); B62B 2202/42 (2013.01); F16D 2121/14 (2013.01); F16D 2125/34 (2013.01)

(58) Field of Classification Search
CPC ..... B62B 9/082; B62B 9/097; B62B 2202/42; B62B 5/0461; B62B 5/0433; B62B 5/04
See application file for complete search history.

(56) References Cited

U.S. PATENT DOCUMENTS

| 4,084,663 | A | * | 4/1978 | Haley | ................. B62B 5/04 188/19 |
| 5,632,360 | A | * | 5/1997 | Melara | ............. B60B 33/0042 16/35 R |
| 6,170,615 | B1 | * | 1/2001 | Cheng | ................. B62B 9/082 188/20 |
| 6,341,672 | B1 | * | 1/2002 | Yang | ................. B62B 9/082 188/20 |

(Continued)

FOREIGN PATENT DOCUMENTS

| CN | 201189883 Y | 2/2009 | |
| GB | 2431625 A * | 2/2007 | ............ B62B 7/08 |

*Primary Examiner* — Xuan Lan Nguyen
(74) *Attorney, Agent, or Firm* — Lerner, David, Littenberg, Krumholz & Mentlik, LLP

(57) ABSTRACT

A locking device has two locking mechanisms, a connecting mechanism, and a pedal. Each locking mechanism has a wheel base, a cap, a recoil device, and a locking assembly. The wheel base has a mounting hole having multiple guiding ribs. The recoil device has a recoil member and a recoil spring. The locking assembly is mounted in the wheel base and has a pushing rod, a pushed rod, and a pushing spring. The pushing rod has a ratcheted end. The pushed rod is selectively engaged with and disengaged from the guiding ribs and has a ratcheted end selectively engaged with and disengaged from the ratcheted end of the pushing rod. The pedal is mounted securely on the cap of one of the two locking mechanisms that is defined as a driving locking mechanism.

18 Claims, 13 Drawing Sheets

(56) References Cited

U.S. PATENT DOCUMENTS

| | | | | |
|---|---|---|---|---|
| 7,367,432 B2* | 5/2008 | Chen | ............................ | B62B 7/08 188/19 |
| 7,383,925 B2* | 6/2008 | Chen | ......................... | B62B 9/082 188/19 |
| 2007/0045055 A1* | 3/2007 | Lan | ............................ | B62B 9/08 188/20 |
| 2007/0051565 A1* | 3/2007 | Chen | ......................... | B62B 9/082 188/19 |

* cited by examiner

LOCKING DEVICE FOR WHEELS OF A BABY CARRIAGE

CROSS-REFERENCE TO RELATED APPLICATION

The present application claims priority from Chinese Utility Model Application No. 201721000485.X filed Aug. 10, 2017, the disclosure of which is hereby incorporated herein by reference.

BACKGROUND OF THE INVENTION

1. Field of the Invention

The present invention relates to a locking device, and more particularly to a locking device for wheels of a baby carriage to lock or unlock the wheels of the baby carriage.

2. Description of Related Art

To improve of the safety of the baby carriage, a baby carriage usually has a locking device mounted on wheels of the baby carriage.

China utility model application No. 200820005428.5, entitled "Locking Device For A Baby Carriage" (hereafter referred to as the '428 Patent), discloses a locking device comprising a driving wheel base, a driven wheel base, and a connecting member connected between the wheel bases. The driving wheel base comprises a first housing, a pedal, a ratchet wheel, a first locking assembly, and a connection assembly. The pedal is mounted pivotally on the first housing. The ratchet wheel is mounted in the first housing, is connected with the pedal, and has multiple unidirectional ratchet teeth arranged annularly. The first locking assembly extends selectively out of the first housing. The driven wheel base comprises a second housing and a second locking assembly. The second locking assembly extends selectively out of the second housing. The connecting member has two ends connected respectively with the locking assemblies.

The driving and driven wheel bases are connected respectively two wheels, and each wheel has multiple locking recesses defined in the wheel. When the pedal is stepped on, the ratchet wheel is driven to rotate and the locking assemblies are driven to operate by the connecting member. Accordingly, the locking assemblies can be inserted into corresponding locking recesses in the wheels, and the wheels are locked. In the locked condition, the connecting member keeps pulling the second locking assembly.

However, the ratchet wheel of the conventional locking device has to push the first locking assembly and the connecting member at the same time, and the first locking assembly and the second locking assembly have to be inserted into the corresponding locking recesses in the wheels at the same time. When the sizes of the unidirectional ratchet teeth have deviations, the first locking assembly and the second locking assembly will not be operated at the same time. Therefore, high accuracy in sizes of the ratchet wheel is needed, so the cost for manufacturing the conventional locking device is increased.

To overcome the shortcomings, the present invention tends to provide a locking device for a baby carriage to mitigate or obviate the aforementioned problems.

SUMMARY OF THE INVENTION

The main objective of the invention is to provide a locking device for a baby carriage that can solve the problem that high accuracy in sizes of components is required during manufacture of the conventional locking device.

The locking device has two locking mechanisms, a connecting mechanism, and a pedal. Each locking mechanism has a wheel base, a cap, a recoil device, and a locking assembly. The wheel base has a mounting hole. The mounting hole is defined in the wheel base and has multiple guiding ribs formed longitudinally on an inner surface of the mounting hole, parallel with each other, and arranged at spaced intervals. The cap is rotatably mounted on the wheel base and has a pushing protrusion formed on the cap at a side facing the wheel base and having an inclined surface. The recoil device has a recoil member and a recoil spring. The recoil member is pivotally mounted on the wheel base and connected with the cap. The recoil spring is mounted in the wheel base and has two ends connected respectively with the wheel base and the recoil member. The locking assembly is mounted in the wheel base and has a pushing rod, a pushed rod, and a pushing spring. The pushing rod is mounted slidably in the mounting hole in the wheel base, is moveable relative to the guiding ribs, abuts on the pushing protrusion on the cap, and has a ratcheted end. The pushed rod is mounted moveably and rotatably in the mounting hole in the wheel base, is selectively engaged with and disengaged from the guiding ribs, selectively extends out of the wheel base, and has a ratcheted end selectively engaged with and disengaged from the ratcheted end of the pushing rod. The pushing spring abuts on the pushed rod. The connecting mechanism is mounted between the locking mechanisms and has a connecting pipe and a connecting cable. The connecting pipe is connected with the wheel bases of the two locking mechanisms. The connecting cable is mounted in the connecting pipe and has two ends connected respectively with the recoil members of the recoil devices of the two locking mechanisms. The pedal is mounted securely on the cap of one of the two locking mechanisms that is defined as a driving locking mechanism.

Other objects, advantages and novel features of the invention will become more apparent from the following detailed description when taken in conjunction with the accompanying drawings.

DETAILED DESCRIPTION OF PREFERRED EMBODIMENT

Figure 1:
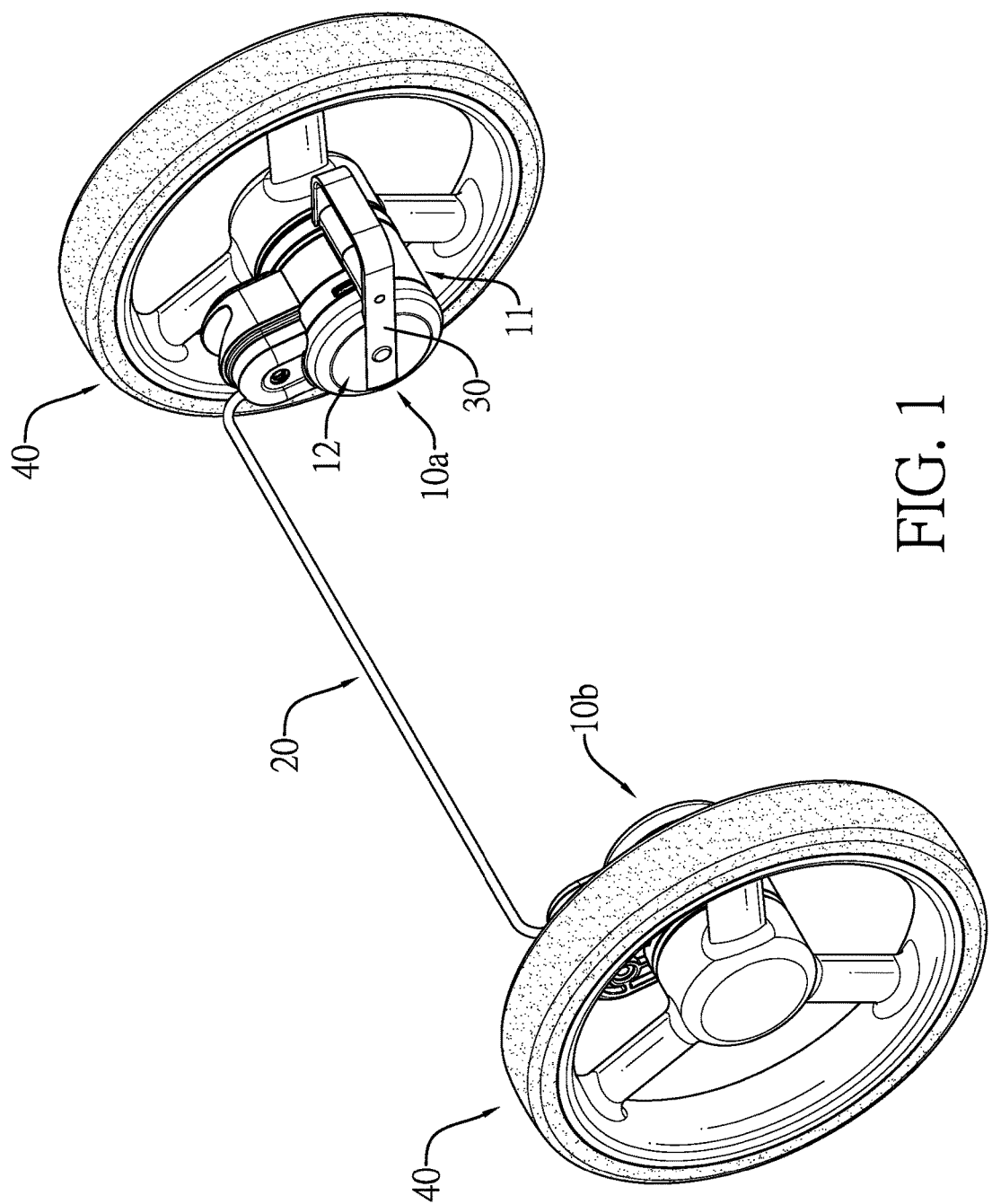
FIG. 1 is a perspective view of a locking device in accordance with the present invention mounted on wheels of a baby carriage.
Figure 2:
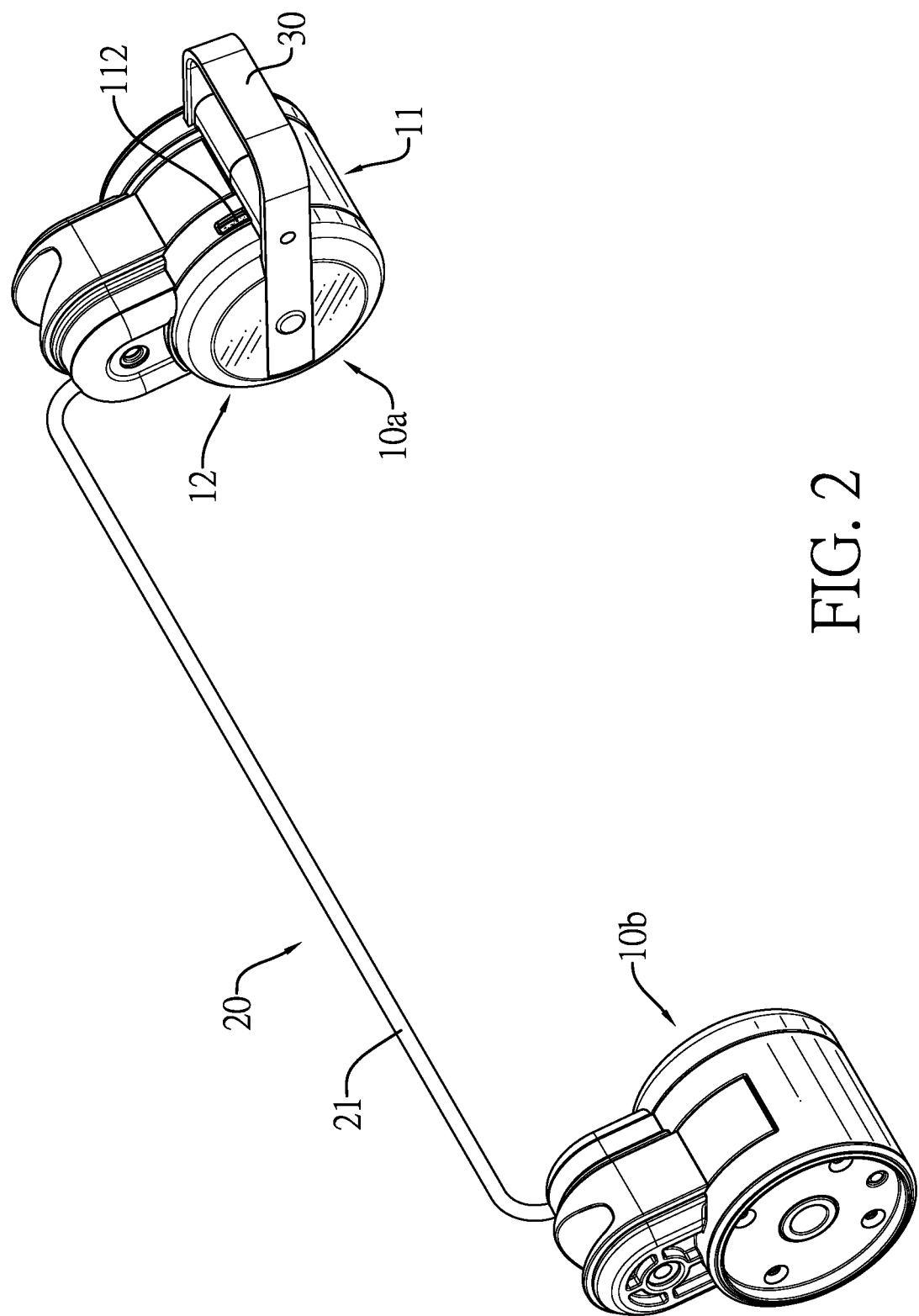
FIG. 2 is a perspective view of the locking device in FIG. 1.

With reference to FIGS. 1 and 2, a locking device in accordance with the present invention is mounted on a frame of a baby carriage, is mounted between wheels 40 of the baby carriage, and comprises two locking mechanisms 10, a connecting mechanism 20, and a pedal 30.

With reference to FIGS. 3 to 6, each locking mechanism 10 comprises a wheel base 11, a cap 12, a recoil device 13, and a locking assembly 14. The wheel base 11 has a mounting hole 110 defined in the wheel base 11. The mounting hole 110 has multiple guiding ribs 111 formed longitudinally on an inner surface of the mounting hole 110, parallel with each other, and arranged at spaced intervals. The cap 12 is mounted rotatably on the wheel base 11 and has a pushing protrusion 120 formed on the cap 12 at a side facing the wheel base 11 and having an inclined surface. The recoil device 13 comprises a recoil member 130 and a recoil spring 131. The recoil member 130 is pivotally mounted on the wheel base 11 and connected with the cap 12. The recoil spring 131 is mounted in the wheel base 11 and has two ends connected respectively with the wheel base 11 and the recoil member 130. The locking assembly 14 is mounted in the wheel base 11 and comprises a pushing rod 15, a pushed rod 16, and a pushing spring 17. The pushing rod 15 is mounted slidably in the mounting hole 110 in the wheel base 11, is moveable relative to the guiding ribs 111, abuts the pushing protrusion 120 on the cap 12, and has a ratcheted end. The pushed rod 16 is mounted moveably and rotatably in the mounting hole 110 in the wheel base 11, is selectively engaged with and disengaged from the guiding ribs 111, selectively extends out of the wheel base 11, and has a ratcheted end selectively engaged with and disengaged from the ratcheted end of the pushing rod 15. The pushing spring 17 abuts on the pushed rod 16. With reference to FIG. 2, the two locking mechanisms 10 are defined respectively as a driving mechanism 10a and a driven locking mechanism 10b.

Figure 3:
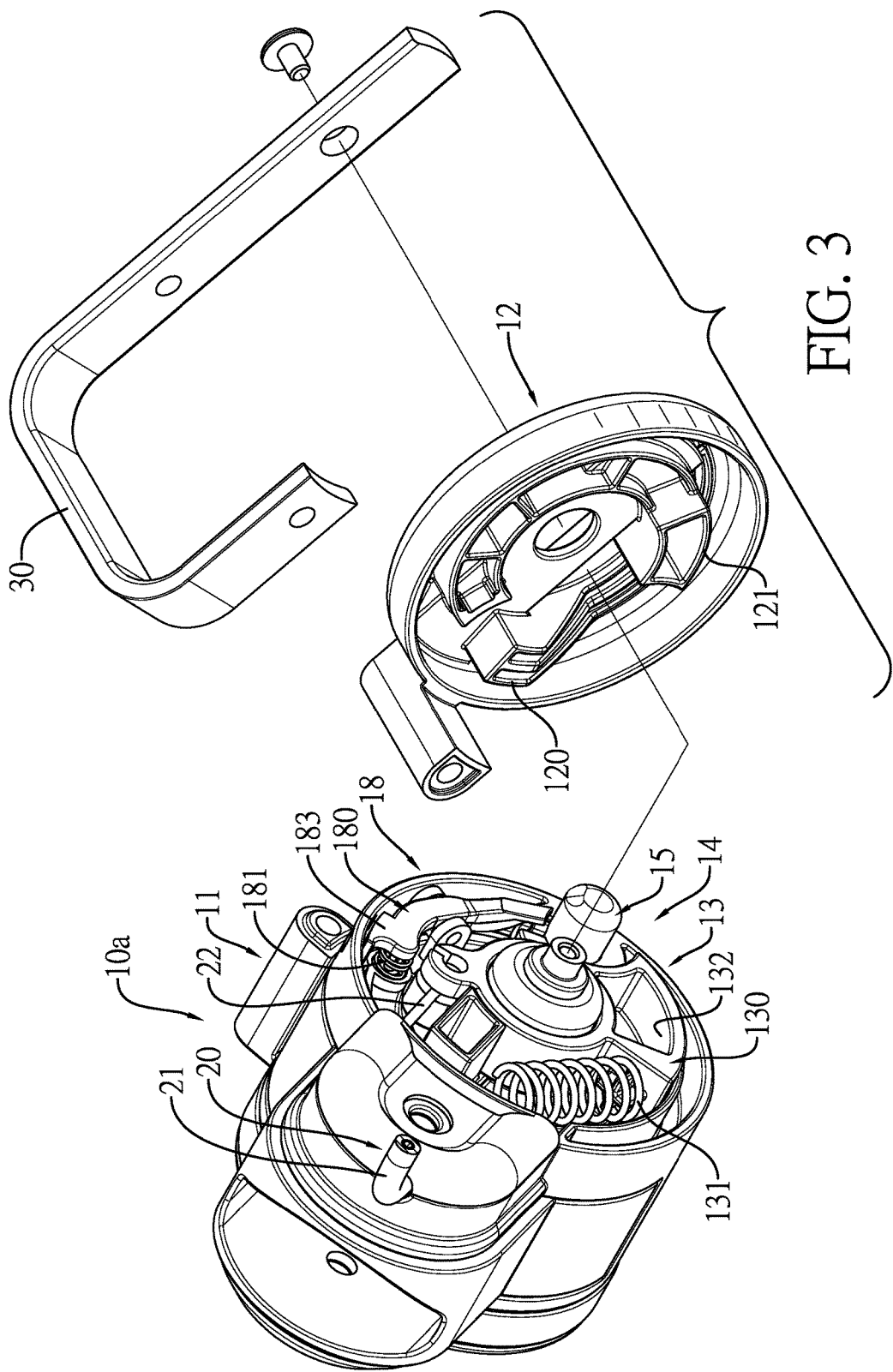
FIG. 3 is an enlarged exploded perspective view of the driving locking mechanism and the pedal of the locking device in FIG. 1.
Figure 6:
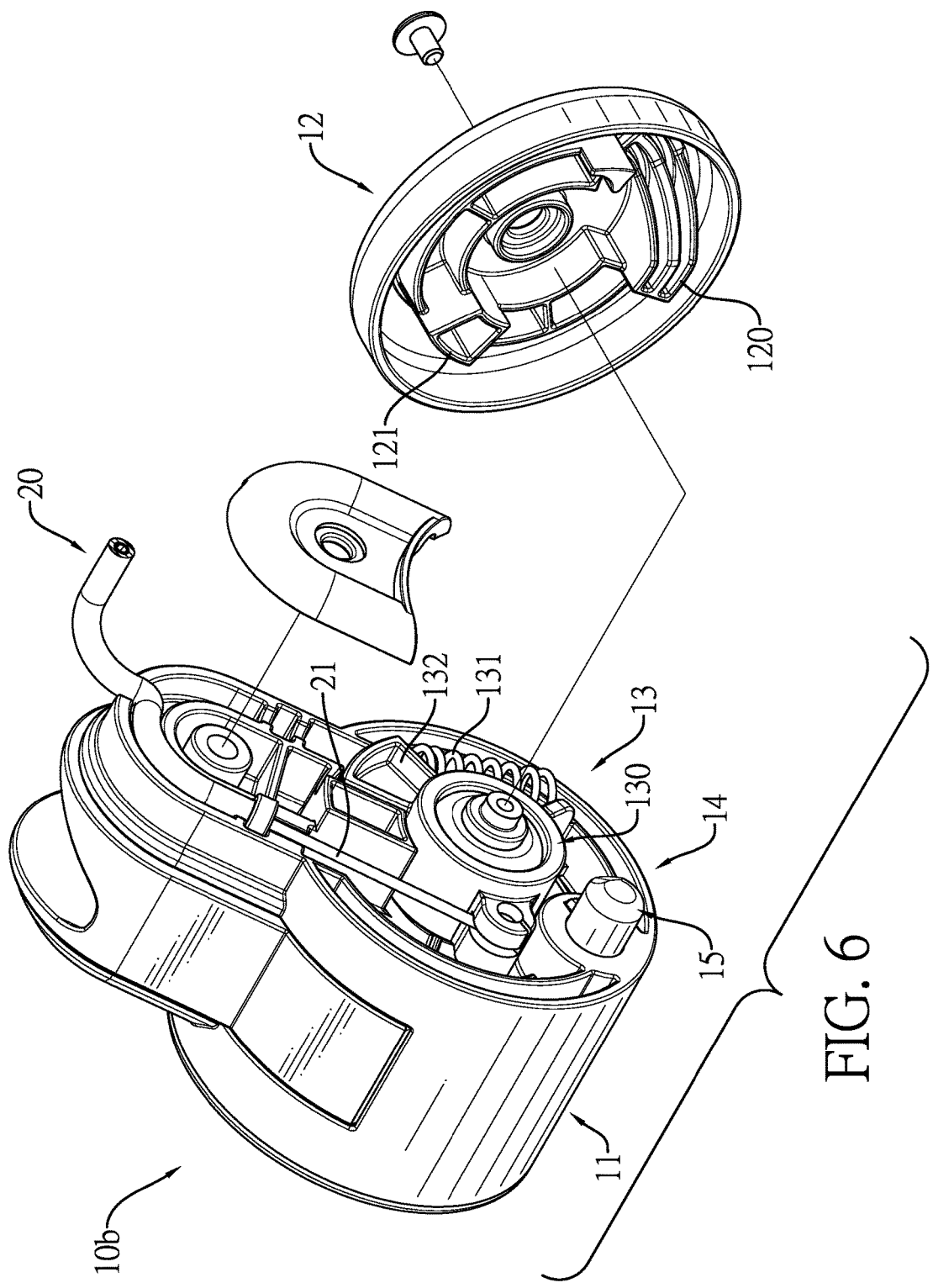
FIG. 6 is an enlarged exploded perspective view of the driven locking mechanism of the locking device in FIG. 1.

With reference to FIGS. 2, 3, and 6, the connecting mechanism 20 is mounted between the locking mechanisms 10 and comprises a connecting pipe 21 and a connecting cable 22. The connecting pipe 21 is connected with the wheel bases 11 of the two locking mechanisms 10. The connecting cable 22 is mounted in the connecting pipe 21 and has two ends connected respectively with the recoil members 130 of the recoil devices 13 of the two locking mechanisms 10.

With reference to FIG. 2, the pedal 30 is mounted securely on the cap 12 of the driving locking mechanism 10a.

Figure 7:
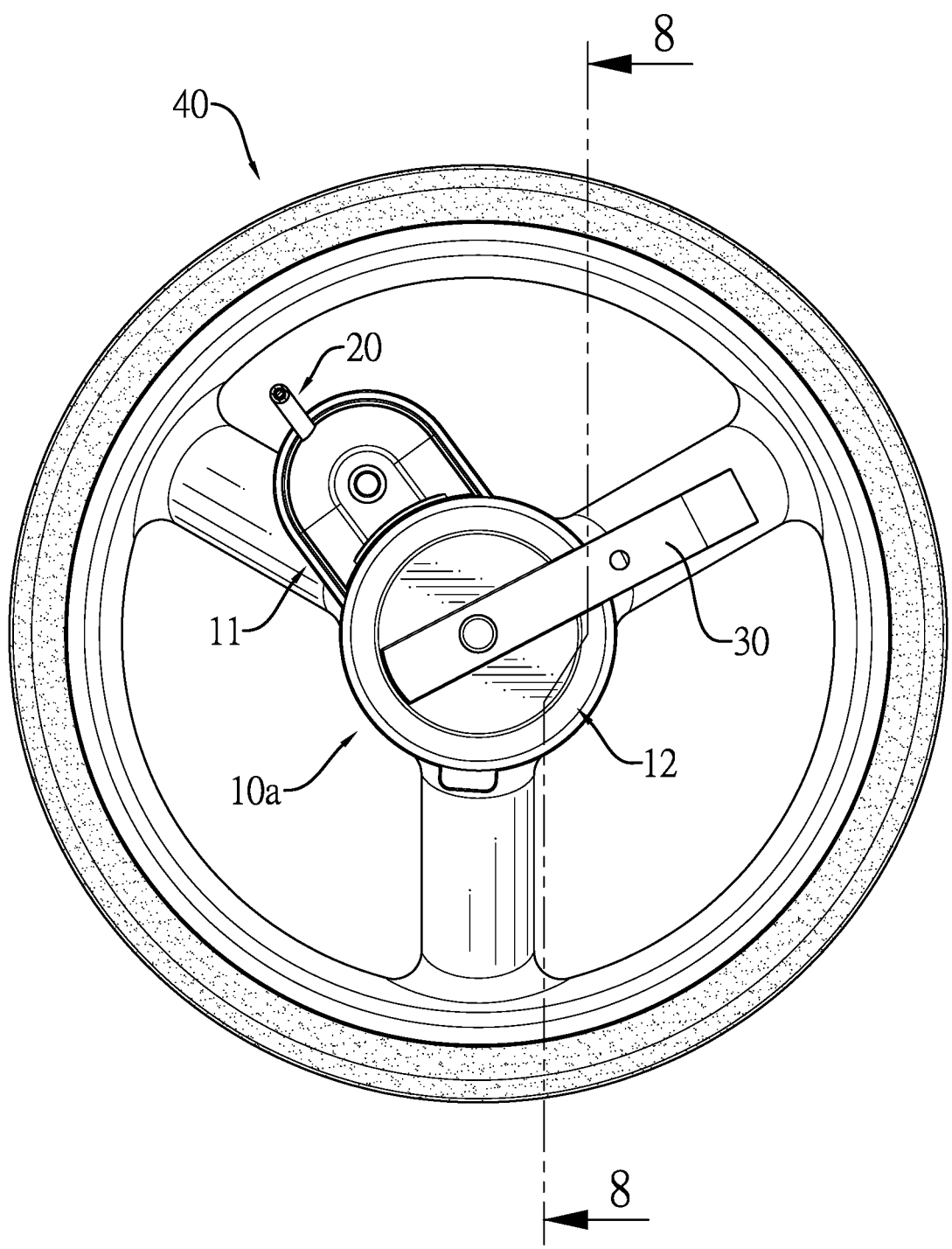
FIG. 7 is an enlarged side view of the driving locking mechanism of the locking device in FIG. 1.
Figure 8:
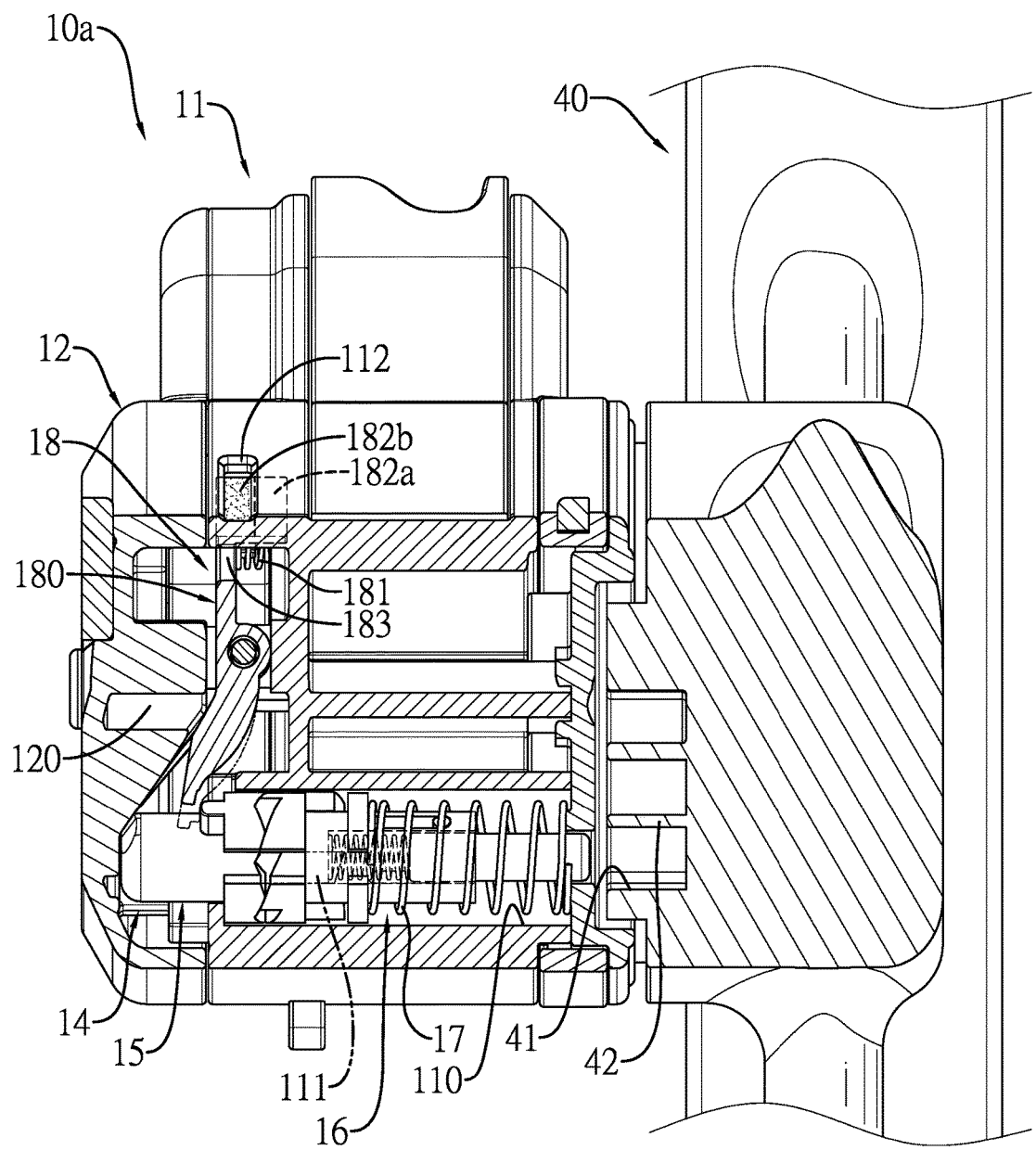
FIG. 8 is a side view in partial section of the driving locking mechanism of the locking device along the line 8-8 in FIG. 7.
Figure 9:
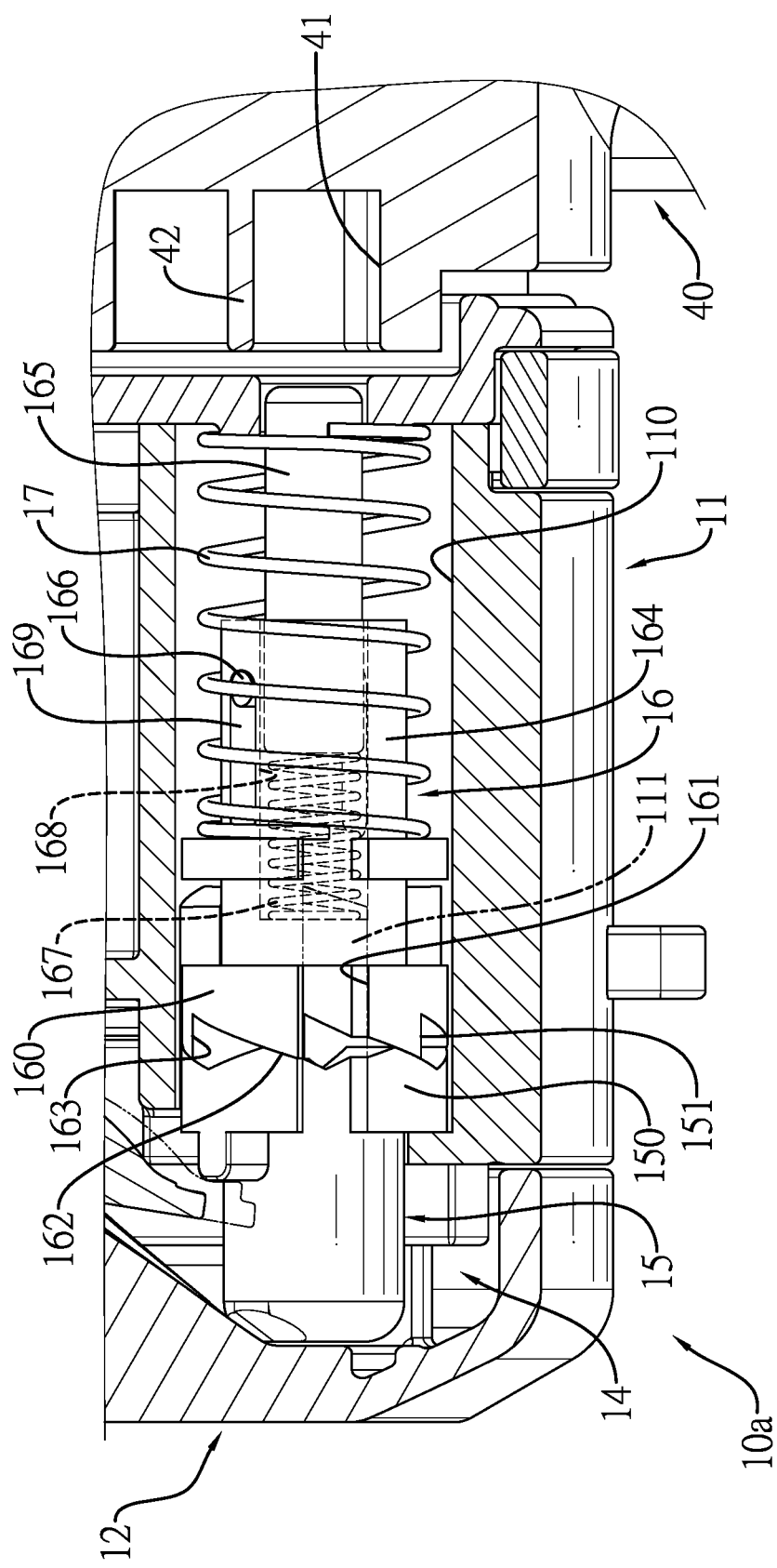
FIG. 9 is an enlarged side view in partial section of the driving locking mechanism in FIG. 8.

With reference to FIGS. 7 to 9, the ratcheted end of the pushing rod 15 of each locking mechanism 10 has multiple guiding ratchet teeth 150 arranged annularly. Each guiding ratchet tooth 150 is located between adjacent two of the guiding ribs 111 in the mounting hole 110. The ratcheted end of the pushed rod 16 has multiple unidirectional ratchet teeth 160 and multiple guiding grooves 161 defined respectively between the unidirectional ratchet teeth 160. The unidirectional ratchet teeth 160 of the pushed rod 16 selectively abut on the guiding ratchet teeth 150 on the pushing rod 50 and the guiding ribs 111. In addition, each guiding ratchet tooth 150 has two inclined guiding surfaces 151 parallel with each other. Each unidirectional ratchet tooth 160 has two inclined abutting surfaces 162 and a longitudinal limiting surface 163. The inclined abutting surfaces 162 are parallel with the inclined guiding surfaces 151 of the guiding ratchet teeth 150 on the pushing rod 15. The longitudinal limiting surface 163 is located between the two inclined abutting surfaces 162.

Figure 4:
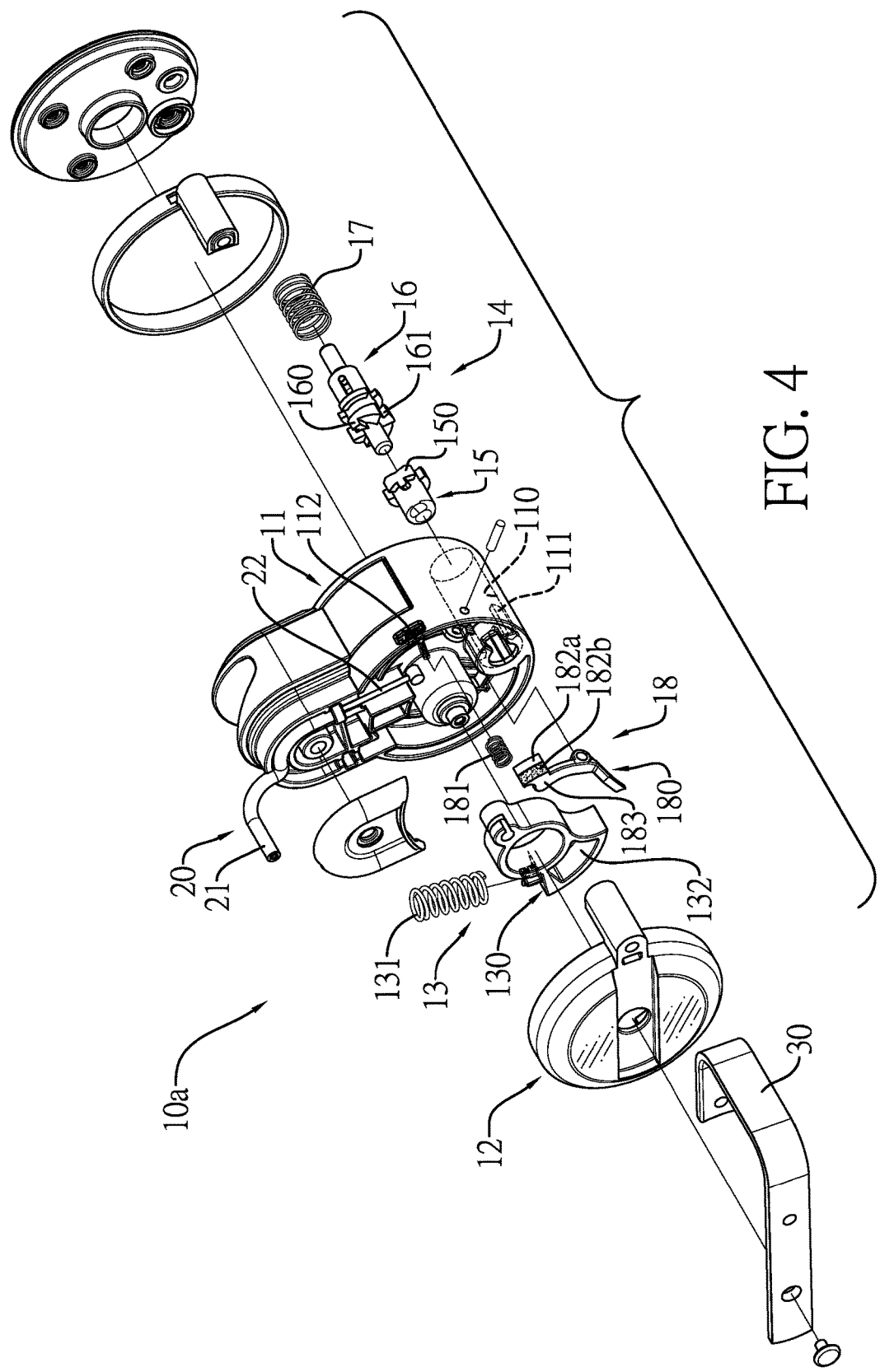
FIG. 4 is an enlarged exploded perspective view of the driving locking mechanism of the locking device in FIG. 1.
Figure 5:
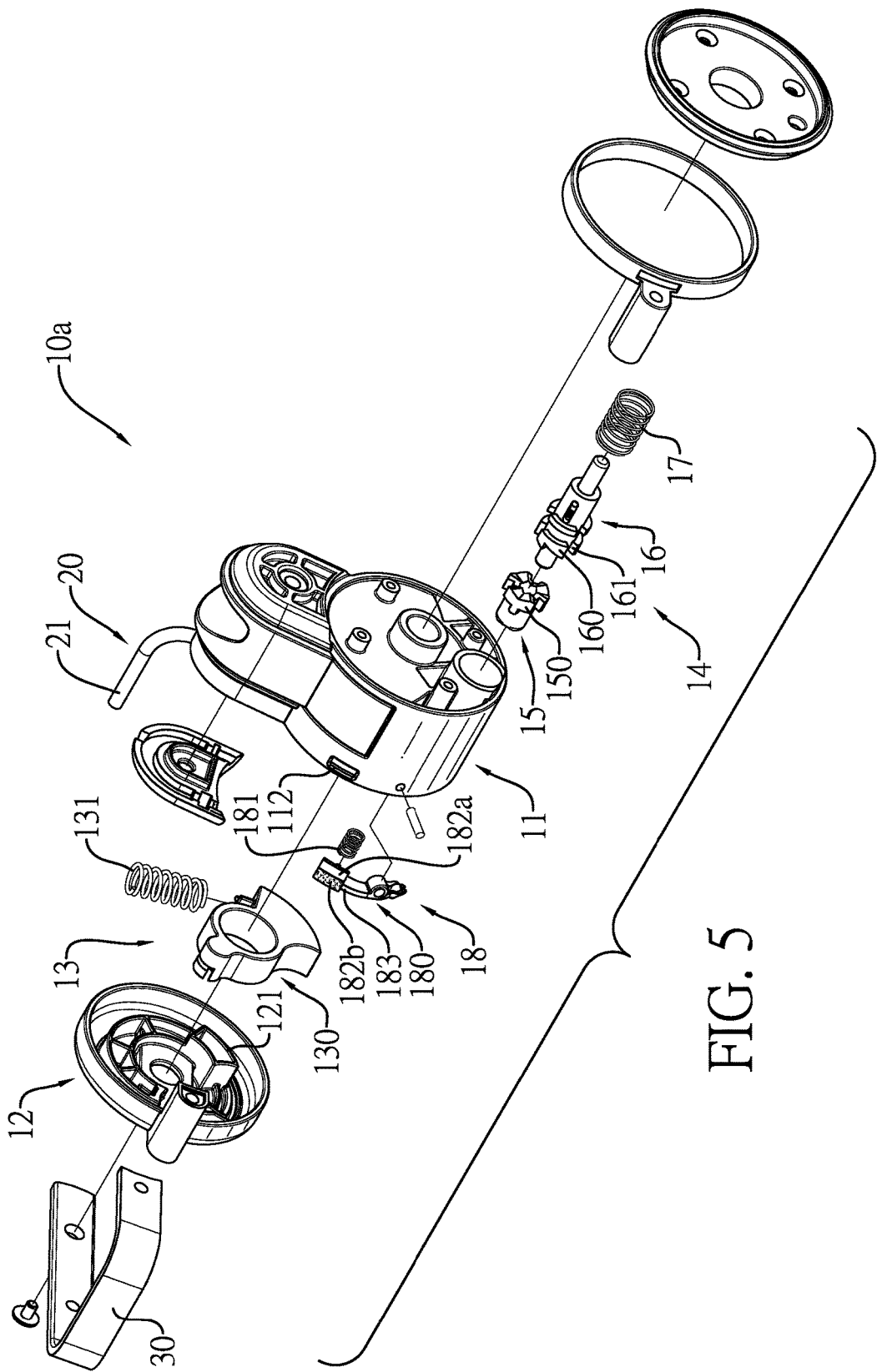
FIG. 5 is another enlarged exploded perspective view of the driving locking mechanism of the locking device in FIG. 1.

With reference to FIG. 4, the wheel base 11 of the driving locking mechanism 10a has a window 112. The driving locking mechanism 10a further has a tag assembly 18 mounted on the wheel base 11 of the driving locking mechanism 10a and comprises a tag unit 180 and a compression spring 181. The tag unit 180 is mounted pivotally on the wheel base 11 and has a first end and a second end, the first end of the tag unit 180 abuts on the pushing rod 15 of the driving locking mechanism 10a, and the second end of the tag unit 180 is provided with a tag segment 183 comprising two tag areas 182a, 182b selectively aligned with the window 112. The two tag areas 182a, 182b are defined respectively as a locked area 182a and an unlocked area 182b. The compression spring 181 has two ends abutting respectively on the tag segment 180 and the wheel base 11.

With reference to FIGS. 8 to 11, the pushed rod 16 of each locking mechanism 10 comprises a rod body 164, a locking member 165, a pin 166, and a buffer spring 167. The rod body 164 has a buffering space 168 defined in the rod body 164 and two limiting grooves 169 defined in the rod body 164 and communicating with the buffering space 168. The locking member 165 is mounted axially moveably in the buffering space 168 in the rod body 164. The pin 166 is mounted on the locking member 165 and has two ends extending respectively into the limiting grooves 169. The buffer spring 167 is mounted in the buffering space 168 in the rod body 164 and has two ends abutting respectively on the rod body 164 and the locking member 165. In addition, the recoil member 130 may further have a connection recess 132 defined in the recoil member 130. The cap 12 has a connection protrusion 121 formed on and protruding from the cap 12 and extending into the connection recess 132 of the recoil member 130.

Figure 10:
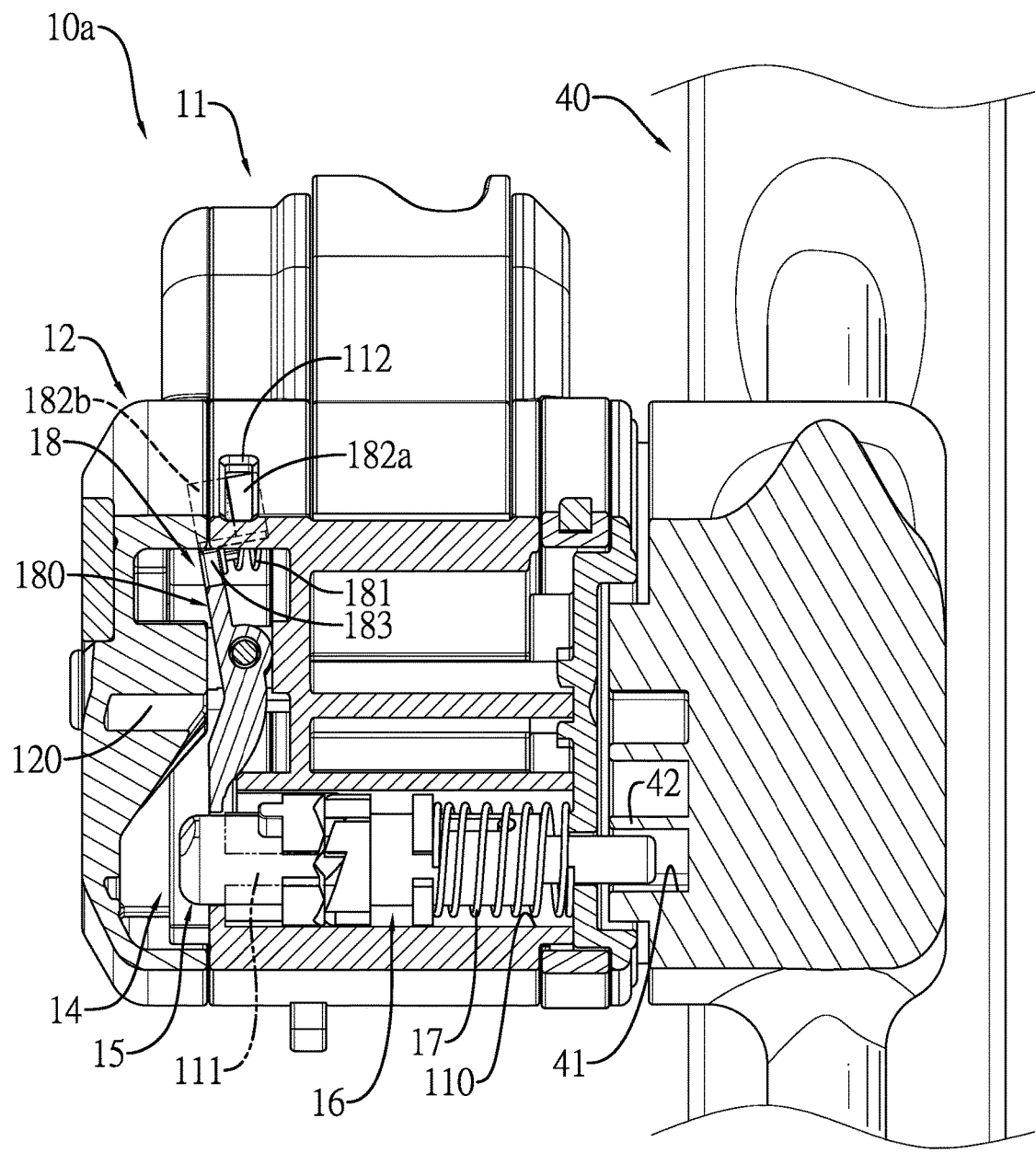
FIG. 10 is an operational enlarged side view in partial section of the locking device in FIG. 1 in a locked condition.
Figure 12:
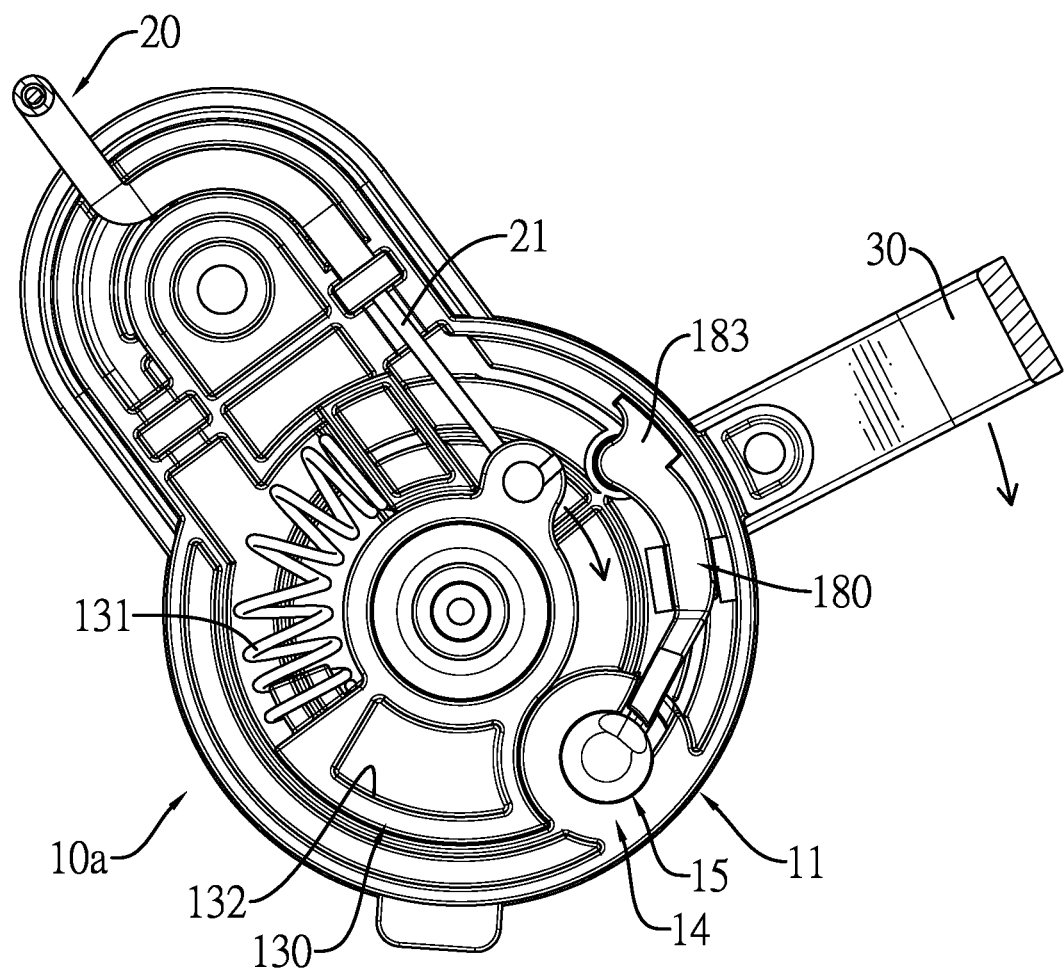
FIG. 12 is an enlarged operational side view of the driving locking mechanism of the locking device in FIG. 1.
Figure 13:
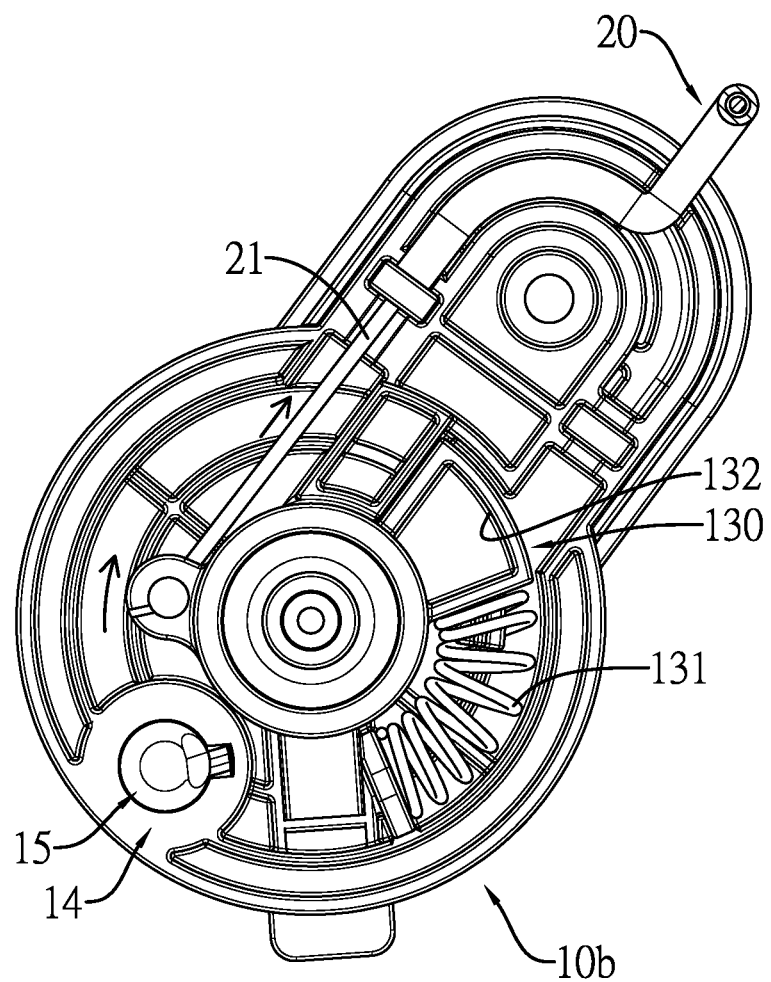
FIG. 13 is an enlarged operational side view of the driven locking mechanism of the locking device in FIG. 1.

With reference to FIGS. 8 and 10, each wheel 40 of the baby carriage has multiple engaging recesses 41 arranged at spaced intervals, and a baffle 42 is formed between each adjacent two of the engaging recesses 41. The locking mechanisms 10 are combined respectively with the wheels 40. With reference to FIGS. 12 and 13, to lock the wheels 40 of the baby carriage, the pedal 30 is stepped on and the cap 12 of the driving locking mechanism 10a is pivotally rotated. With the pivotal rotation of the cap 12, the recoil member 130 is rotated to pull the connecting cable 22 of the connecting mechanism 20. Consequently, the cap 12 and the recoil member 130 of the driven locking mechanism 10b are also rotated simultaneously. With reference to FIGS. 3 and 6, while the caps 12 of the locking mechanisms 10 are rotating, the inclined surfaces on the pushing protrusions 120 on the caps 12 will push the locking assemblies 14 respectively. With reference to FIG. 10, the pushed rod 16 of each locking mechanism 10 will extend out of the corresponding wheel base 11 and into a corresponding one of the engaging recesses 41 in the corresponding wheel 40. Accordingly, the wheels 40 are locked. At this time, the pedal 30 can be released, and the recoil springs 131 will push the recoil members 130 to move to the original positions respectively. The caps 12 and the pedal 30 will rotate in reverse to the original positions, and the connecting cable 22 is released.

Figure 11:
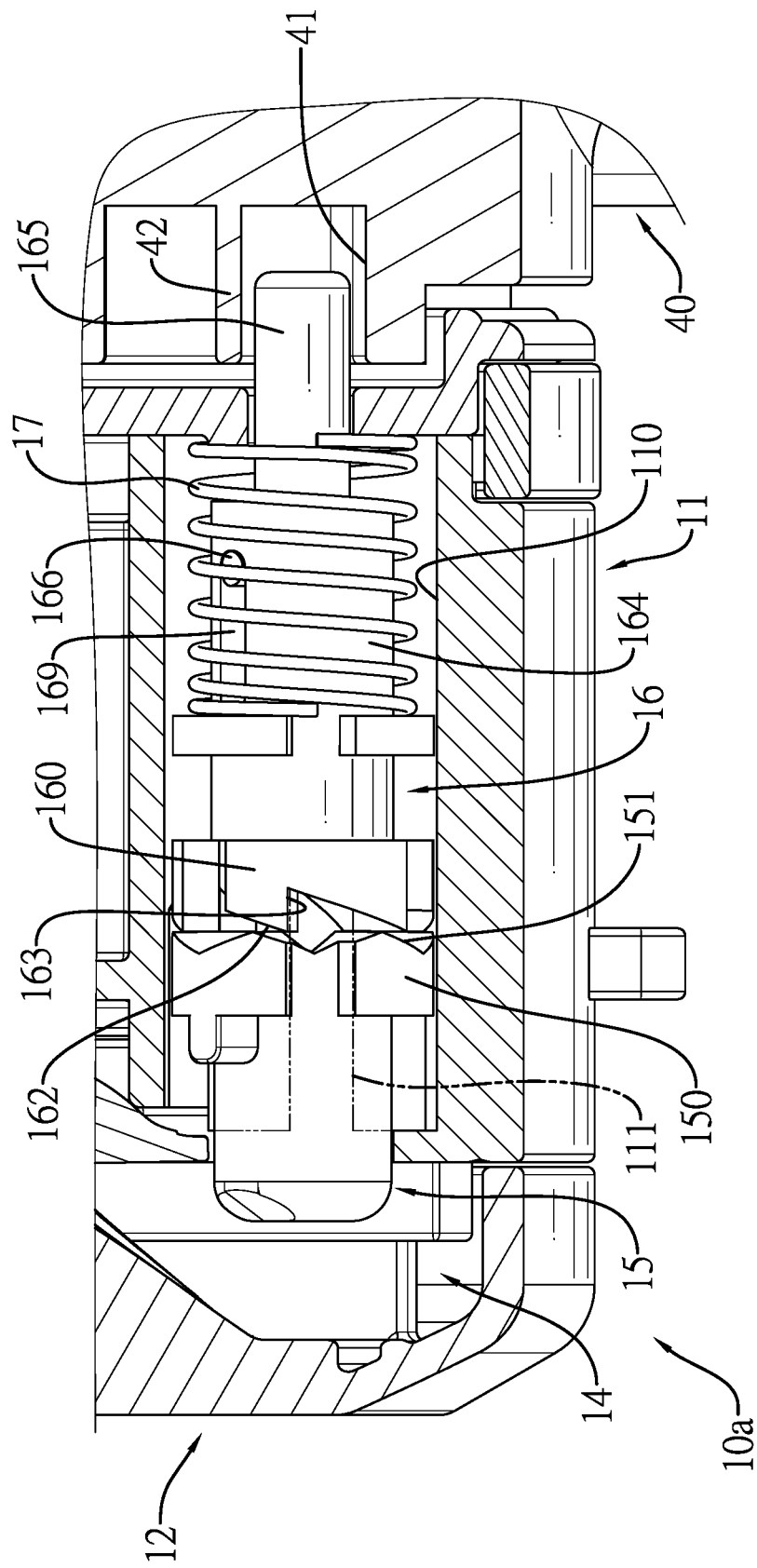
FIG. 11 is an enlarged side view in partial section of the locking device in FIG. 10.

With reference to FIGS. 8 and 9, before the pedal 30 is stepped on to lock the wheels 40, the guiding ribs 111 on each wheel base 11 extend respectively into the guiding grooves 161 in the pushed rod 16. When the pedal 30 is stepped on and the pushing protrusion 120 on the cap 12 pushes against the locking assembly 14, the pushing rod 15 will push against the pushed rod 16 to disengage the guiding ribs 111 from the guiding grooves 161 on the pushed rod 16. Consequently, the pushed rod 16 will extend out of the wheel base 11. At this time, the inclined abutting surfaces 162 of the unidirectional ratchet teeth 160 on the pushed rod 16 will abut respectively on the inclined guiding surfaces 151 on the guiding ratchet teeth 150 of the pushing rod 15 by the force provided by the pushing spring 17, and the pushed rod 16 is rotated. With reference to FIGS. 10 and 11, when the pedal 30 is released, the pushing spring 17 will push the pushed rod 16 to enable the inclined abutting surfaces 162 on the unidirectional ratchet teeth 160 on the pushed rod 16 to abut on the guiding ribs 111 and the pushed rod 16 is rotated. The guiding ribs 111 will abut respectively on the longitudinal limiting surfaces 163 on the unidirectional ratchet teeth 160 and the adjacent inclined abutting surfaces 162. Accordingly, the pushed rod 16 can be kept at the position that extends out of the wheel base 11, and the wheels 40 are held in the locked condition.

With reference to FIGS. 12 and 13, to unlock the wheels 40 of the baby carriage, the pedal 30 is stepped on and the cap 12 and the recoil member 13 of the driving locking mechanism 10a are rotated. The cap 12 and the recoil member 13 of the driven mechanism 10b are also driven to rotate at the same time. With reference to FIGS. 3 and 6, the pushing protrusions 120 on the caps 12 will push against the locking assemblies 14. With reference to FIG. 8, the pushed rods 16 will be disengaged from the corresponding engaging recesses 41 in the wheels 40 to unlock the wheels 40. At this time, the pedal 30 is released, and the recoil members 130 are moved to the original positions by the recoil springs 131, and the caps 12, the pedal 30, and the connecting cables 22 are moved to the original positions.

With reference to FIGS. 10 and 11, before the pedal 30 is stepped on to unlock the wheels 40, the guiding ribs 111 abut on the longitudinal limiting surfaces 163 and the adjacent inclined abutting surfaces 162 respectively. When the pedal 30 is stepped on and pushing protrusions 120 on the caps 12 push against the locking assemblies 14, the pushing rods 15 will push the pushed rods 16 to move and to disengage the unidirectional ratchet teeth 160 on the pushed rods 16 from the guiding ribs 111. At this time, the inclined abutting surfaces 162 on the unidirectional ratchet teeth 160 of each pushed rod 16 will abut respectively on the inclined guiding surfaces 151 on the guiding ratchet teeth 150 of the corresponding pushing rod 15 by the pushing spring 17, and the pushed rod 16 is rotated. With reference to FIGS. 8 and 9, when the pedal 30 is released, the pushing spring 17 will push the pushed rod 16 to enable the inclined abutting surfaces 162 on the unidirectional ratchet teeth 160 to abut respectively on the guiding ribs 111, and the pushed rod 16 is rotated. With the rotation of the pushed rod 16, the guiding ribs 111 will enter respectively into the guiding grooves 161 in the pushed rod 16. Consequently, the pushed rods 16 will be disengaged from the corresponding engaging recesses 41 in the wheels 40, and the wheels 40 are unlocked.

With reference to FIGS. 9 and 11, if the pedal 30 is stepped on when the pushed rods 16 are misaligned with the engaging recesses 41 in the wheels 40, each pushed rod 16 will abut against one of the baffles 42 on the corresponding wheel 40. At this time, the locking member 165 will be retracted into the buffering space 168 in the rod body 164, and the buffer spring 167 is compressed. Accordingly, a buffering effect is provided to the pushed rod 16 to prevent the pushed rod 16 from being damaged. When the wheels 40 are rotated to align with one of the engaging recesses 41 with the corresponding pushed rod 16, the locking member 165 will be pushed to enter into the corresponding engaging recesses 41 by the buffer spring 167 to lock the wheels 40.

With reference to FIGS. 8 and 10, when the locking device is in the locked condition, the tag unit 180 will be pushed to rotate by the compression spring 181, and the locked area 182a will be aligned with the window 112. When the locking device is under the unlocked condition, the tag unit 180 will be pushed by the pushing rod 15 to align the unlock area 182b with the window 112. Accordingly, a user can know the condition of the locking device through the window 112.

With such an arrangement, the pushing protrusions 120 on the caps 12 can push the locking assemblies 14 to a locked condition or an unlocked condition. The structural volume of the locking assemblies 14 can be effectively reduced, and high accuracy in sizes of the components is unnecessary. Therefore, the cost for manufacturing the locking device can be reduced, and the operations of the two locking mechanisms 10 can be accurately simultaneous.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device for wheels of a baby carriage comprising:
  two locking mechanisms, and each locking mechanism having
    a wheel base having
      a mounting hole defined in the wheel base and having multiple guiding ribs formed longitudinally on an inner surface of the mounting hole, the guiding ribs being parallel with each other and arranged at spaced intervals;
    a cap mounted rotatably on the wheel base and having
      a pushing protrusion formed on the cap at a side facing the wheel base and having an inclined surface;
    a recoil device comprising
      a recoil member pivotally mounted on the wheel base and connected with the cap; and
      a recoil spring mounted in the wheel base and having two ends connected respectively with the wheel base and the recoil member; and
    a locking assembly mounted in the wheel base and comprising
      a pushing rod mounted slidably in the mounting hole in the wheel base, being moveable relative to the guiding ribs, abutting on the pushing protrusion on the cap, and having a ratcheted end;
      a pushed rod mounted moveably and rotatably in the mounting hole in the wheel base, selectively engaged with and disengaged from the guiding ribs, selectively extending out of the wheel base, and having a ratcheted end selectively engaged with and disengaged from the ratcheted end of the pushing rod; and
a pushing spring abutting on the pushed rod;
a connecting mechanism mounted between the locking mechanisms and comprising
a connecting pipe connected with the wheel bases of the two locking mechanisms; and
a connecting cable mounted in the connecting pipe and having two ends connected respectively with the recoil members of the recoil devices of the two locking mechanisms; and
a pedal mounted securely on the cap of one of the two locking mechanisms that is defined as a driving locking mechanism.

2. The locking device as claimed in claim 1, wherein
the ratcheted end of the pushing rod of each locking mechanism has multiple guiding ratchet teeth arranged annularly;
each guiding ratchet tooth of the pushing rod of each locking mechanism is located between adjacent two of the guiding ribs in the mounting hole of the wheel base of the locking mechanism;
the ratcheted end of the pushed rod of each locking mechanism has multiple unidirectional ratchet teeth and multiple guiding grooves defined respectively between the unidirectional ratchet teeth; and
the unidirectional ratchet teeth of the pushed rod of each locking mechanism selectively abut on the guiding ratchet teeth on the pushing rod and the guiding ribs of the locking mechanism.

3. The locking device as claimed in claim 2, wherein
each guiding ratchet tooth of each locking mechanism has two inclined guiding surfaces parallel with each other; and
each unidirectional ratchet tooth of each locking mechanism has
two inclined abutting surfaces parallel with the inclined guiding surfaces of the guiding ratchet teeth on the pushing rod of the locking mechanism; and
a longitudinal limiting surface located between the two inclined abutting surfaces.

4. The locking device as claimed in claim 3, wherein
the wheel base of the driving locking mechanism has a window; and
the driving locking mechanism further has a tag assembly mounted on the wheel base of the driving locking mechanism and comprising
a tag unit mounted pivotally on the wheel base and having a first end abutting on the pushing rod of the driving locking mechanism and a second end provided with a tag segment comprising two tag areas selectively aligned with the window; and
a compression spring having two ends abutting respectively on the tag segment and the wheel base of the driving locking mechanism.

5. The locking device as claimed in claim 4, wherein the pushed rod of each locking mechanism comprises
a rod body having a buffering space defined in the rod body and two limiting grooves defined in the rod body and communicating with the buffering space;
a locking member mounted moveably in the buffering space in the rod body;
a pin mounted on the locking member and having two ends extending respectively into the limiting grooves; and
a buffer spring mounted in the buffering space in the rod body and having two ends abutting respectively on the rod body and the locking member.

6. The locking device as claimed in claim 5, wherein
the recoil member of each locking mechanism further has a connection recess defined in the recoil member; and
the cap of each locking mechanism has a connection protrusion formed on and protruding from the cap and extending into the connection recess of the recoil member of the locking mechanism.

7. The locking device as claimed in claim 4, wherein
the recoil member of each locking mechanism further has a connection recess defined in the recoil member; and
the cap of each locking mechanism has a connection protrusion formed on and protruding from the cap and extending into the connection recess of the recoil member of the locking mechanism.

8. The locking device as claimed in claim 2, wherein
the wheel base of the driving locking mechanism has a window; and
the driving locking mechanism further has a tag assembly mounted on the wheel base of the driving locking mechanism and comprising
a tag unit mounted pivotally on the wheel base and having a first end abutting on the pushing rod of the driving locking mechanism and a second end provided on a tag segment comprising two tag areas selectively aligned with the window; and
a compression spring having two ends abutting respectively on the tag segment and the wheel base.

9. The locking device as claimed in claim 8, wherein the pushed rod of each locking mechanism comprises
a rod body having a buffering space defined in the rod body and two limiting grooves defined in the rod body and communicating with the buffering space;
a locking member mounted moveably in the buffering space in the rod body;
a pin mounted on the locking member and having two ends extending respectively into the limiting grooves; and
a buffer spring mounted in the buffering space in the rod body and having two ends abutting respectively on the rod body and the locking member.

10. The locking device as claimed in claim 9, wherein
the recoil member of each locking mechanism further has a connection recess defined in the recoil member; and
the cap of each locking mechanism has a connection protrusion formed on and protruding from the cap and extending into the connection recess of the recoil member of the locking mechanism.

11. The locking device as claimed in claim 8, wherein
the recoil member of each locking mechanism further has a connection recess defined in the recoil member; and
the cap of each locking mechanism has a connection protrusion formed on and protruding from the cap and extending into the connection recess of the recoil member of the locking mechanism.

12. The locking device as claimed in claim 1, wherein
the wheel base of the driving locking mechanism has a window; and
the driving locking mechanism further has a tag assembly mounted on the wheel base of the driving locking mechanism and comprising a tag unit mounted pivotally on the wheel base and having a first end abutting on the pushing rod of the driving locking mechanism and a second end provided with a tag segment comprising two tag areas selectively aligned with the window; and a compression spring having two ends abutting respectively on the tag segment and the wheel base.

13. The locking device as claimed in claim 12, wherein the pushed rod of each locking mechanism comprises a rod body having a buffering space defined in the rod body and two limiting grooves defined in the rod body and communicating with the buffering space;

a locking member mounted moveably in the buffering space in the rod body;

a pin mounted on the locking member and having two ends extending respectively into the limiting grooves; and a buffer spring mounted in the buffering space in the rod body and having two ends abutting respectively on the rod body and the locking member.

14. The locking device as claimed in claim 13, wherein the recoil member of each locking mechanism further has a connection recess defined in the recoil member; and the cap of each locking mechanism has a connection protrusion formed on and protruding from the cap and extending into the connection recess of the recoil member of the locking mechanism.

15. The locking device as claimed in claim 12, wherein the recoil member of each locking mechanism further has a connection recess defined in the recoil member; and the cap of each locking mechanism has a connection protrusion formed on and protruding from the cap and extending into the connection recess of the recoil member of the locking mechanism.

16. The locking device as claimed in claim 3, wherein the pushed rod of each locking mechanism comprises a rod body having a buffering space defined in the rod body and two limiting grooves defined in the rod body and communicating with the buffering space;

a locking member mounted moveably in the buffering space in the rod body;

a pin mounted on the locking member and having two ends extending respectively into the limiting grooves; and a buffer spring mounted in the buffering space in the rod body and having two ends abutting respectively on the rod body and the locking member.

17. The locking device as claimed in claim 2, wherein the pushed rod of each locking mechanism comprises a rod body having a buffering space defined in the rod body and two limiting grooves defined in the rod body and communicating with the buffering space;

a locking member mounted moveably in the buffering space in the rod body;

a pin mounted on the locking member and having two ends extending respectively into the limiting grooves; and a buffer spring mounted in the buffering space in the rod body and having two ends abutting respectively on the rod body and the locking member.

18. The locking device as claimed in claim 1, wherein the pushed rod of each locking mechanism comprises a rod body having a buffering space defined in the rod body and two limiting grooves defined in the rod body and communicating with the buffering space;

a locking member mounted moveably in the buffering space in the rod body;

a pin mounted on the locking member and having two ends extending respectively into the limiting grooves; and a buffer spring mounted in the buffering space in the rod body and having two ends abutting respectively on the rod body and the locking member.

\* \* \* \* \*